United States Patent [19]

Guttmann

[11] 4,195,255

[45] Mar. 25, 1980

[54] ELECTRONIC BRAKE FOR AC MOTORS

[75] Inventor: Emil J. Guttmann, Morton Grove, Ill.

[73] Assignee: Cole-Parmer Instrument Company, Chicago, Ill.

[21] Appl. No.: 857,214

[22] Filed: Dec. 5, 1977

[51] Int. Cl.² .............................................. H02P 3/18
[52] U.S. Cl. ................................... 318/762; 318/364; 318/375
[58] Field of Search ............... 318/364, 365, 372, 373, 318/211, 212, 375, 377, 378, 759-762; 307/141, 141.1

[56] References Cited

U.S. PATENT DOCUMENTS

| | | | |
|---|---|---|---|
| 3,398,343 | 8/1968 | Plumpe, Jr. | 318/212 |
| 3,475,669 | 10/1969 | Oltendorf | 318/373 |
| 3,708,734 | 2/1972 | Rowe | 318/762 |
| 3,714,536 | 1/1973 | Foster | 318/364 |
| 3,897,595 | 7/1975 | Fearno | 318/762 |
| 3,903,464 | 7/1974 | Lyon et al. | 318/760 |

FOREIGN PATENT DOCUMENTS 1456450  11/1976  United Kingdom ................ 318/373

Primary Examiner—David Smith, Jr.
Assistant Examiner—M. K. Mutter
Attorney, Agent, or Firm—Fitch, Even & Tabin

[57] ABSTRACT

A circuit for electronically braking an AC motor. The circuit includes a controlled rectifying means for applying DC to the motor and a control means for turning the rectifying means on after deactuation of the motor for a timed interval determined by the charging rate of a timing capacitor through a variable resistance.

12 Claims, 1 Drawing Figure

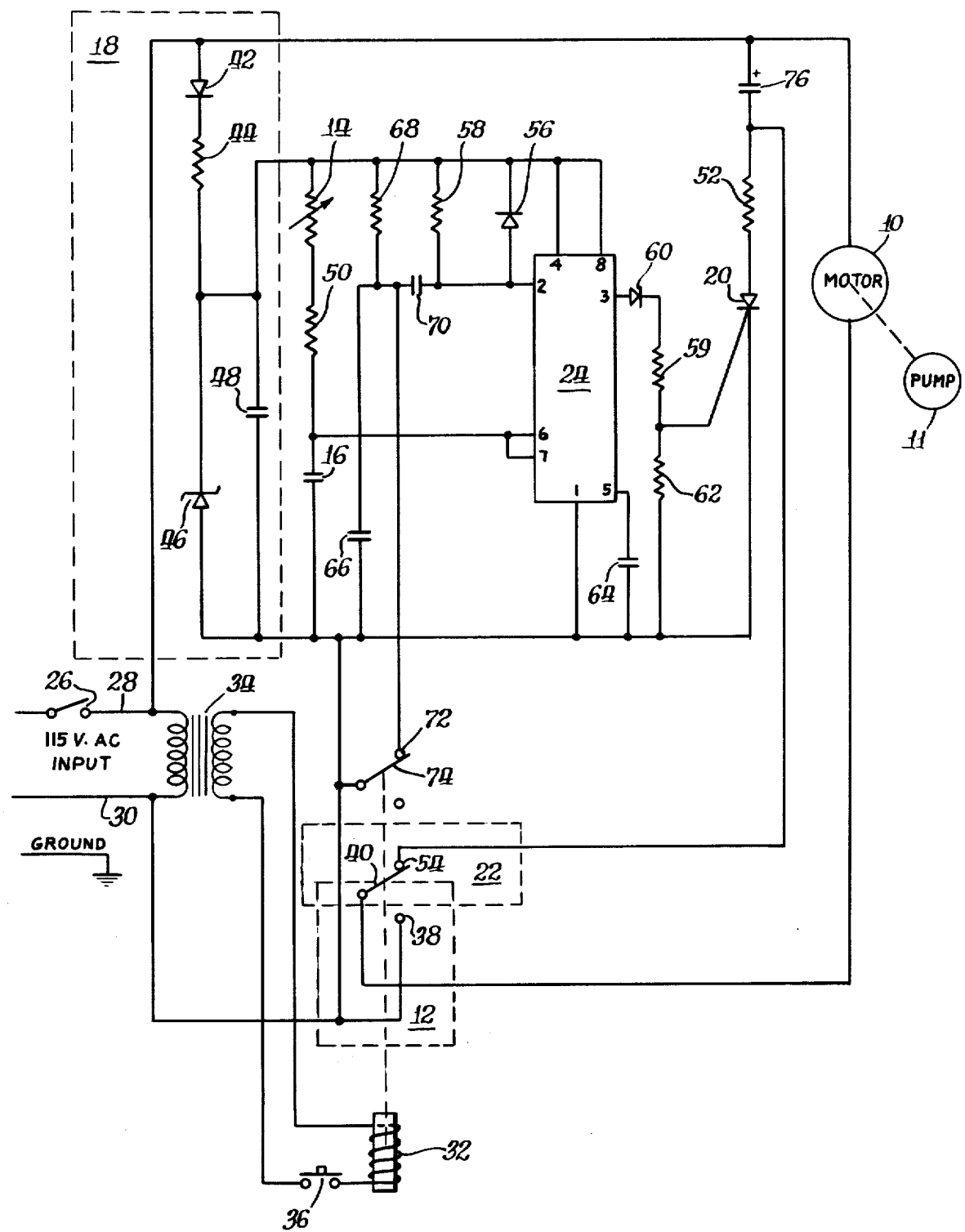

ELECTRONIC BRAKE FOR AC MOTORS

The present invention relates to electronic circuits for braking AC motors, and more particularly to circuits for braking motors employed in dispensing systems.

In certain applications for AC motors, it is desirable that the motor not be allowed to coast to a stop. For example, in a dispensing system where a motor and pump are powered for a given length of time to dispense a fixed volume of liquid, if the motor is allowed merely to coast to a stop, variations in sample size will occur. Mechanical brakes have been used but these have suffered due to wear and heating, especially where the motor is started and stopped repeatedly in a short span of time. Therefore, it is desirable to use a brake that does not depend upon friction.

Prior proposed electronic braking circuits include an SCR switch which is turned on for a timed interval which is determined by the value of a capacitor. The capacitor is discharged directly into the gate of the SCR switch which rectifies the AC power applied to a motor. Thus the timed interval is very dependent upon the particular capacitance value of the capacitor and the particular gate trigger characteristics of the SCR switch employed. The time needed to brake the motor (hereinafter the braking time) is related to the duration of the timed interval. The particular capacitance value of the capacitor may vary due to capacitor aging. Therefore, the timed interval (and thus the braking time) is also subject to the effects of capacitor aging. In addition, due to normal manufacturing tolerances, the capacitance value may vary by as much as 10% from capacitor to capacitor in production quantities resulting in the timed interval also varying by that amount. Furthermore, different motors and motor loads require different timed intervals. Thus, since capacitors suitable for this purpose are manufactured at certain standard values, it may not be possible to obtain the timed interval required by a particular application. In addition, these circuits are not readily adaptable to changing the timed interval should it become desirable to change the interval due to a new application for the AC motor or to restore the interval due to capacitor aging or variations in SCR characteristics.

It is an object of the present invention to provide an electronic braking circuit obviating, for practical purposes, the above mentioned limitations heretofore present.

Other objects and advantages of the invention are more particularly set forth in the following detailed description, and in the accompanying drawing which is an electrical schematic diagram showing a preferred embodiment of the present invention.

With reference to the FIGURE, a circuit is shown in accordance with an embodiment of the present invention for electronically braking an AC motor 10, such as a shaded pole or capacitor start AC motor for example, operated by an AC power source (not shown). The circuit generally comprises a means 12 for removing the AC power source from motor 10, a variable resistance 14, and a timing capacitor 16 to be charged from a DC voltage source 18 through variable resistance 14 such that the charging rate of capacitor 16 is capable of being varied by variable resistance 14. The circuit further comprises a controlled rectifying means 20 for rectifying the AC power to DC power, means 22 for applying the DC power to the motor, and control means 24 for turning on the controlled rectifying means, for comparing the voltage level across capacitor 16 with a predetermined voltage level, and for enabling the controlled rectifying means to turn off after a timed interval defined by when the voltage across capacitor 16 reaches the predetermined level so that the timed interval is a function of the variable resistance 14.

In the preferred embodiment, the present invention is used to brake a motor 10 which powers a pump 11 in a dispensing system. Thus the braking time may be controlled so that the volume of liquid dispensed during braking may be controlled. Here, means for supplying AC for powering motor 10 comprises a switch 26 having input lines 28 and 30 from an AC power source. Means 12 for removing the AC power source from a shaded pole AC motor 10 is comprised of double pole-double throw relay 32 (hereinafter relay 32) which is powered by step-down transformer 34. Transformer 34 is coupled to the AC power source and is also coupled to relay 32 by means of normally open, momentary contact switch 36. Motor 10 is directly connected to line 28 of the AC power source and can also be connected to line 30 of the AC power source by means of stationary contact 38 and movable contact 40 of relay 32.

The DC voltage source 18 is comprised of rectifier diode 42 in series with current limiting resistor 44, and the parallel combination of Zener diode 46 and filter capacitor 48. Line 28 of the AC power source is connected to the anode of diode 42 whose cathode is connected by means of resistor 44 to the cathode of Zener diode 46 and to the positive end of capacitor 48. DC supply voltage Vcc is thus supplied at the positive end of capacitor 48.

Variable resistance 14, shown as a potentiometer in the preferred embodiment, fixed resistor 50, and timing capacitor 16 define a time constant of the circuit and determine the duration of the timed interval in which DC power is applied to brake the motor 10, as is hereinafter discussed. The timed interval is thus a function of potentiometer 14. Timing capacitor 16 is connected to Vcc at the positive end of filter capacitor 48 by means of limiting resistor 50 and potentiometer 14.

Controlled rectifying means 20 for rectifying the AC power to DC power is a thyristor switch, or in particular, an SCR switch in the preferred embodiment. Means 22 for applying the DC power to motor 10 comprises relay 32 which is powered by transformer 34 by means of switch 36 as noted earlier. Motor 10 can be connected to line 28 of the AC power source and to the anode of SCR switch 20 by means of movable contact 40 and stationary contact 54 of relay 32 and current limiting resistor 52. The cathode of SCR switch 20 is connected to line 30 of the AC power source. A smoothing capacitor 76 is connected between line 28 of the AC source and resistor 52 to provide relatively constant DC power to motor 10 while SCR switch 20 is turned on.

Control means 24 for turning on the SCR switch 20, for comparing the voltage level across timing capacitor 16 with a predetermined voltage level, and for enabling the SCR switch 20 to turn off upon reversal of AC polarity after the voltage across capacitor 16 reaches the predetermined level, is a monostable, multivibrator integrated circuit 24 (hereinafter IC 24) having terminals 1-8 in the preferred embodiment. Terminals 4 and 8 of IC 24 are connected to Vcc at the positive end of capacitor 48, and trigger terminal 2 is connected to Vcc by means of protective diode 56 and bias resistor 58. Input terminals 6 and 7 are connected to timing capacitor 16. Output terminal 3 is connected to the gate of SCR switch 20 by means of a voltage divider, comprised of resistors 59 and 62, and diode 60, the anode of which is connected to IC 24. The diode insures that the charge on the gate of the SCR can discharge thru 62 but cannot reach IC 24 and effect its performance. Terminal 1 of IC 24 connects directly to line 30 and terminal 5 is indirectly connected to line 30 by means of filter capacitor 64.

A capacitor 66 and relay 32 produce a pulse to trigger IC 24 when it is desired to turn on SCR swtich 20 for the timed interval. The positive end of capacitor 66 is connected to Vcc by means of resistor 68 and is connected to trigger terminal 2 by means of capacitor 70. The positive end of capacitor 66 can also be connected to the negative end of capacitor 66 by means of stationary contact 72 and movable contact 74 of relay 32, thereby short-circuiting capacitor 66. The negative end of capacitor 66 is connected to line 30 of the AC power input.

While motor 10 is operating, switch 36 is closed, allowing relay 32 to be energized. Switch 36 carries only low voltage to minimize shock hazards for applications where an operator holds switch 36. If the low voltage feature is not desired, relay 32 and transformer 34 could be replaced by a DPDT toggle switch, of course.

When energized, movable contact 40 of relay 32 is caused to move against stationary contact 38 thus completing the AC power circuit to motor 10. In addition, movable contact 74 of relay 32 is caused to move away from stationary contact 72 removing the short circuit, allowing capacitor 66 to charge from the DC voltage supply. Until IC 24 is triggered, timing capacitor 16 is short-circuited internally by IC 24 and thereby not allowed to charge.

As noted earlier, motor 10 can be braked by the application of DC power. The braking time is a function of the magnitude of the current applied and the duration of the timed interval that the current is applied. A small current is desirable since excessively large DC currents may cause motor overheating and would require a relay with a large contact current rating. Therefore, current-limiting resistor 52 is chosen sufficiently large to protect motor 10.

When switch 36 is opened, relay 32 is deenergized and movable contact 40 is caused to move away from stationary contact 38 into contact with stationary contact 54 thereby removing the AC power from motor 10 and connecting rectifying means SCR switch 20 to motor 10. At the same time, movable contact 74 is caused to move into contact with stationary contact 72 thereby short-circuiting capacitor 66 which produces a negative pulse. This pulse is applied to terminal 2 of IC 24 which triggers IC 24. IC 24 thereupon releases the short circuit across capacitor 16 and produces a "high" output at terminal 3. This high output supplies a relatively constant gate current to SCR switch 20 allowing SCR switch 20 to rectify the current applied to motor 10 from the AC power source which causes motor 10 to begin to brake. Upon the release of the short circuit across capacitor 16 by IC 24, capacitor 16 charges from DC supply 18 at a rate determined by the value of capacitor 16 and the values of resistor 50 and potentiometer 14. When the voltage across capacitor 16 reaches two-thirds Vcc, IC 24 resets by short-circuiting capacitor 16 and causing the output at terminal 3 to go "low" which enables SCR switch 20 to turn off upon polarity reversal. Motor 10 may now be operated again by closing switch 36. Since the duration of the application of DC current to motor 10 is dependent upon the charging rate of capacitor 16, the braking time of motor 10 can be easily controlled by adjustments to potentiometer 14.

Thus, in a dispenser system, for example, the user may desire to change the size of the pump, or the viscosity or volume per sample of the material to be pumped. If any of these changes require the brake time to change, the variable resistance 14 need merely be reset to change the brake time. If desired, the potentiometer 14 in the preferred embodiment could be mounted on a cabinet so that non-technical personnel could change the brake time by adjusting the potentiometer without going inside the cabinet and thus exposing the circuitry to possible damage, or dust, etc.

The present embodiment of the invention is particularly suitable for applications where a pump drive is started and stopped repeatedly in a short span of time. For example, 10 start-stop cycles in 15 seconds may be desired. Due to the time desired to pump the sample and the reaction time of the operator, the maximum time allowed for braking may be 0.5 seconds. By adjusting the potentiometer, the present circuit could be set for such a brake time.

One desirable construction of the preferred embodiment of the invention illustrated in the drawing, may be constructed with the following component values:

diode 46—12 V Zener diode
diodes 42, 56 and 60—1 A diode
SCR 20—silicon controlled rectifier
resistor 44—4 Kohms, 5 W
resistor 50—100 ohms
variable resistance 14—1 Meg. ohm potentiometer
resistor 68—270 Kohm, ¼ W
resistor 58—18 Kohm, ¼ W
resistor 62—2.2 Kohm, ¼ W
resistor 59—10 Kohm, ¼ W
resistor 52—10 ohms, 20 W
capacitor 48—1000 mfd., 25 VDC
capacitor 16—0.47 mfd., 200 VDC
capacitor 66—0.47 mfd., 200 VDC
capacitor 70—0.01 mfd., 200 VDC
capacitor 64—0.01 mfd., 200 VDC
capacitor 76—100 mfd., 350 VDC
switch 26—on-off power switch
switch 36—normally open push button switch
transformer 34—115 V to 12 V transformer
relay 32—12 V coil, DPDT relay
IC 24—integrated circuit NE 555.

It will of course be understood that modifications of the present invention in its various aspects will be apparent to those skilled in the art, some being apparent only after study and others being merely matters of routine electronic design. As such, the scope of the invention should not be limited by the particular embodiment and specific instructions herein described but should be defined only by the appended claims and equivalents thereof.

Various features of the present invention are set forth in the following claims.

What is claimed is:

1. A circuit for electronically braking a motor operated by an AC power source comprising:

first switch means coupling one side of the AC power source to one side of the motor when said switch means is in its closed condition;

a DC voltage source;

a variable resistance;

a first capacitor connected to said DC voltage source through said variable resistance such that the charging rate of the capacitor is capable of being varied by said variable resistance;

means for permitting said DC voltage source to charge said first capacitor when said first switch means is opened and removes AC power from the motor;

a thyristor switch having a gate, an anode and a cathode, said cathode being connected to the one side of the AC power source;

a resistor connected by one end to said anode;

second switch means for coupling the other end of said resistor to the one side of said motor when said first switch means is in its opened condition, the other side of said motor being connected to the other side of the AC power source; and control means having an output coupled to the gate for applying a constant DC voltage to said gate for turning on the thyristor swtich when said first switch means is in its opened condition and having an input connected to said first capacitor for comparing the voltage level across the first capacitor with a predetermined voltage level, and for removing the DC voltage from the gate to enable the thyristor switch to turn off after a timed interval defined by when the voltage across the first capacitor reaches the predetermined level so that the timed interval is a function of the variable resistance.

2. A dispensing system wherein a fixed volume is to be dispensed after each deactuation of an operator actuated switch comprising:

a pump;

an AC motor for powering the pump;

a pair of lines for supplying AC;

first switch means coupling one of said lines to one side of the motor when said switch means is in its closed condition, said switch means being opened in response to deactuation of said operator actuated switch;

a DC voltage source;

a variable resistance;

a first capacitor connected to said DC voltage source through said variable resistance such that the charging rate of the capacitor is capable of being varied by said variable resistance;

means for permitting said DC voltage source to charge said first capacitor when said first switch means is in its opened condition and removes AC power from the motor;

a thyristor switch having a gate, an anode and a cathode, said cathode being connected to said one line;

a resistor connected by one end to said anode;

second switch means for coupling the other end of said resistor to the one side of said motor when said first switch means is in its opened condition, the other side of said motor being connected to the other line; and control means having an output coupled to the gate for applying a constant DC voltage to said gate for turning on the thyristor switch when said first switch means is in its opened condition and having an input connected to said first capacitor for comparing the voltage level across the first capacitor with a predetermined voltage level, and for removing the DC voltage from the gate to enable the thyristor switch to turn off after a timed interval defined by when the voltage across the first capacitor reaches the predetermined level so that the timed interval is a function of the variable resistance.

3. The circuit of either of claims 1 or 2 wherein the permitting means comprises a short-circuiting means to short-circuit the first capacitor while the motor is operating.

4. The circuit of either of claims 1 or 2 wherein the circuit further comprises a second capacitor operatively connected between the other end of said resistor and the other side of the AC power source to smooth the DC power produced by the thyristor switch.

5. The circuit of claim 1 further comprising a manually operated switch means for providing a signal to initiate braking wherein the first switch means removes the AC power source from the motor in response to the signal.

6. The circuit of either claim 1 or 2 wherein the control means comprises a multivibrator.

7. The circuit of claim 6 wherein the multivibrator comprises an integrated circuit.

8. The circuit of claim 6 wherein the circuit further comprises a trigger means for triggering the multivibrator to turn on the thyristor switch and to initiate comparing.

9. The circuit of claim 8 wherein the trigger means comprises a third capacitor coupled to the DC voltage source and also coupled to the multivibrator; and a second short-circuiting means for short-circuiting the third capacitor to produce a trigger signal to the multivibrator.

10. The circuit of claim 9 wherein the first switch means for removing the AC power source from the motor, the second switch means for applying the DC power to the motor, and the second short-circuiting means comprises a double-pole, double-throw switch.

11. The circuit of claim 10 wherein the double-pole, double-throw switch comprises a relay, the circuit further comprising a manually operated switch means operably connected to the relay for controlling the energizing of the relay.

12. A circuit for electronically braking an AC motor powering a pump in a dispensing system for dispensing samples of a fixed volume comprising:

a motor for powering the pump;

means for supplying AC for powering the motor;

a DC voltage source operatively coupled to the AC;

a first switch for de-coupling the AC from the motor;

a variable resistance;

a first capacitor operably connected to the variable resistance, with the first capacitor and variable resistance coupled to the DC voltage source so that the first capacitor may be charged from the DC voltage source at a rate variable by the variable resistance;

a thyristor having a gate, for rectifying the AC to DC power;

a second switch coupled to the first switch so that the first and second switches operate substantially at the same time, for coupling the motor and the thyristor to the AC;

a second capacitor for smoothing the DC power rectified by the thyristor, coupled to the motor and operably connected to the thyristor;

an integrated circuit multivibrator having an output operably connected to the gate of the thyristor, having a trigger input, a second input operably connected to the DC voltage source and a third input coupled to the first capacitor, and having means for operably short-circuiting the first capacitor until the multivibrator is triggered, means for comparing the voltage across the first capacitor with a predetermined proportion of the voltage from the DC voltage source, and means for outputting a sufficiently high voltage to turn the thyristor on when the multivibrator is triggered and for outputting a sufficiently low voltage to enable the thyristor to turn off, when the voltage across the first capacitor reaches the predetermined proportion of the voltage from the DC voltage source;

a third capacitor coupled to the DC voltage source, and operably connected to the trigger input of the multivibrator; and a third switch coupled to the first switch so that the first, second and third switches operate at substantially the same time, for operably short-circuiting the third capacitor to produce a trigger pulse, whereby the motor begins to brake when the first, second, and third switches are operated.

* * * * *